Patented Aug. 22, 1939

2,170,518

UNITED STATES PATENT OFFICE 2,170,518

SALAD DRESSING

Albert Musher, New York, N. Y., assignor to Musher Corporation, Elizabeth, N. J., a corporation of New Jersey No Drawing. Application August 7, 1936, Serial No. 94,863

6 Claims. (Cl. 99—144)

This invention relates to food products, more particularly of the type of salad dressings, and especially to a salad dressing base that may be readily converted by simple means into different types of dressings, such as mayonnaise, etc.

Prior to the advent of factory-made mayonnaise, mayonnaise and similar salad dressings were usually made in the home from the usual types of ingredients, including eggs, spices, such as salt, mustard, pepper, paprika, etc., the procedure generally involving adding the usual spices, such as those mentioned, to the egg, followed by the addition of some lemon juice or vinegar, and after such combination was made, the salad oil was very gradually worked into the mass, such as by adding such salad oil very slowly, drop by drop at first, and at the same time applying continuous, incessant and vigorous beating in order to emulsify the oil into the egg and water phase. Many difficulties arose, however, in the attempt to produce such dressings at home. A number of factors control the characteristics of the dressing which is ultimately obtained. If the oil is added too fast, or if the mayonnaise is not sufficiently beaten, the product, as stated above, will separate, or under other conditions will be too thin, or a homogeneous smooth admixture of ingredients will not be obtained. The making of mayonnaise in the home or by the consumer has, therefore, constituted a tedious and difficult procedure due to the care required in the introduction of the oil into the other materials, and because of the incessant and vigorous mixing and beating necessary to produce a smooth homogeneous product. Insufficient beating, or too rapid addition of oil, or for other reasons, results in the mayonnaise being a failure, or separation occurs, or a homogeneous product is not secured.

These difficulties have practically led to the discontinuance of the making of salad dressings, such as mayonnaise, in the home, and as a result factory-made mayonnaise and salad dressings have appeared on the market, and have practically displaced home-produced dressings. But factory-made mayonnaise gives rise to a number of difficulties. Although distributed weekly, as is done by several at least of the larger mayonnaise manufacturers, it generally remains in the grocer's warehouse or on the grocer's shelves for a considerable period of time, anywhere from six to eight weeks elapsing before it is actually consumed by the user. And this is particularly true where mayonnaise is distributed by jobbers and others, who do not have a regular weekly distribution service for such perishable foods. And the mayonnaise and similar salad dressings are known to be perishable products, which should desirably be prepared as fresh as possible, and utilized promptly after being made.

Thus after mayonnaise or salad dressing has stood on the grocer's shelf for even a period of time as short as one or two weeks, there is considerable deterioration from the standpoint of flavor and of food value. A number of things lead to such deterioration. The eggs present in such compositions, because of their susceptibility to high bacterial growth, and also probably to protein decomposition or deterioration, common to eggs and egg yolks, particularly when not maintained under refrigerating conditions, and these are generally not possible in the usual store or warehouse, undergo a deterioration not only in quality and health value, but from the flavor standpoint, are very seriously modified in character, it being well known that the flavor of the egg, even after exposure for only a short period of time, materially deteriorates in part at least due to putrefaction or protein decomposition. Another factor entering into the situation is the action of light, air and moisture, which are the three primary factors in causing rancidity in oils and other products. Mayonnaise and similar salad dressings contain a proportionately high quantity of oil intimately disbursed and mixed with as much as 10 to 15% of moisture in the composition, and particularly in the presence of air which is beaten into the product when it is manufactured, are thus exposed to the very conditions causing deterioration in the product, and which conditions cannot be avoided due to the method of manufacture and the materials used in producing such products; and such deterioration is further accelerated by the fact that the mayonnaise packed in glass containers, as is generally done, is exposed to the action of light, which is an additional factor in causing deterioration. It is not surprising, therefore, that in even a relatively short period of time, such as from 4 to 5 days, factory-made mayonnaise is very materially altered in character, and has substantially deteriorated, both in quality and flavor from that of the originally fresh character, and at times even develops a marked rancidity.

These factors are pointed to to show that factory-made mayonnaise is merely a makeshift, which has been heretofore made necessary by the difficulties incurred in an attempt to manufacture or produce mayonnaise in the home for immediate consumption.

Among the objects of the present invention is the production of a base or dressing material that is stable and not subject to deterioration, even under ordinary conditions of storage, and that can be utilized in the home for the ready production of dressings of various types, including mayonnaise, etc., by a simple operation by the housewife with insured success eliminating any of the difficulties and causes of failure heretofore experienced.

Other objects of the invention include the production of such a salad dressing base that can be easily converted into any of various types of dressings by very simple manipulations in the home, and with insured success in the production of a satisfactory, smooth, homogeneous product of high food and health value, free from deterioration, and even utilizing materials which cannot satisfactorily be employed in the production of factory-made mayonnaise, although of the most desirable character for wholesome products.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, it has been found that the various components generally required in the production of salad dressings can be segregated into two classes of materials: first, the materials which are subject to deterioration or decomposition on standing, such as the egg components, or materials like moisture or water, etc., which give rise to conditions accelerating deterioration of the other products; and second, the components that are substantially stable and not subject to deterioration. It has further been found that the latter stable components can be converted into a form and combined so that they may be sold as a commercial entity, and readily utilized by the housewife for simple conversion into a desired salad dressing by adding the additional components, without requiring any elaborate operating steps, simple admixture under ordinary conditions being sufficient to produce a smooth, homogeneous product. By the production of the base containing the spices, some oil, etc., in a form that is readily converted by simple mixing operations in the home into the desired salad dressing with incorporation of the added components, the difficulties of producing salad dressings, such as mayonnaise, in the home are eliminated; and in the second place, deterioration incident to distribution of factory-made products are overcome, since elimination of the egg yolk or other egg products from the dressing base avoids the decomposition which is entailed in such materials by the inclusion of egg products therein, and second preferably the moisture or water elimination, although not essential, is highly desirable and avoids deterioration due to the presence of the moisture. It, therefore, becomes possible under the present invention to utilize the salad dressing base for conversion into mayonnaise or other dressing by a simple operation in the home, utilizing fresh whole eggs or egg yolks, with the addition of water to the base material, without any decomposition having occurred due to the presence of egg or water in the base material.

It further becomes possible to utilize desirable types of oils for incorporation into the base material to produce dressings, which oils, although highly desirable have not been capable of use in factory-made products. Thus in the earlier types of mayonnaise produced in the home, olive oil was employed, and is recognized as one of the best materials to be employed in the production of mayonnaise. It is impossible to produce commercial or factory-made mayonnaise with olive oil, for the reason that such a mayonnaise does not stand up and separates on the retailer's shelf within a relatively short period of time, apparently due to certain physical and chemical characteristics of the olive oil, which affect the emulsification properties in the final product. In accordance with the present invention, however, olive oil may be employed as the salad oil for addition to the dressing base, together with the freshly cracked eggs to produce a very high quality dressing of maximum and desirable flavor—which is the most important feature involved in any event, since such dressings are really condiments.

Accordingly, there is desirably produced a combination of spices and emulsifying agents, together desirably with some oil or fat, which combination is stable, and is sold to the consumer as a salad dressing base that can be readily converted by the consumer with the addition of fresh eggs, and if desired of any additional oil with or without an aqueous material, to give all of the advantages inherent in products of this character. Desirably the basic spices ordinarily used in the preparation of mayonnaise and salad dressings, the powdered or dry emulsifying agents, such as gum tragacanth, gum arabic, or other emulsifying agent, or combinations of these and other emulsifying agents, either with or without an acid such as citric, tartaric, etc., and with or without a dispersing medium, such as an oil, preferably a hydrogenated oil, or similar hardened or semi-hardened oil or fat, are mixed in the most desirable proportions, so that upon addition of an egg with or without oil, and with or without aqueous materials, they may be readily converted into the desired salad dressing.

Accordingly the spices, emulsifying agents and other dry materials can be mixed together and placed in the desired container, after which the oil may be poured on top of the dry materials, or the dry materials may be mixed with the oil, or any method may be utilized for packaging these products.

It has been found, however, that when the spices and emulsifying agents, etc., are mixed together and permitted to stand, there is a tendency for such of these salad dressing components, to cake or pack, and harden sufficiently in the jar into a mass which is difficult to remove, and offers difficulty in distribution in the medium, such as oil or fat, or similar dispersing medium, when the mayonnaise or salad dressing is made by the consumer. Such caked or packed material when removed from the container, is in the form of relatively hard solid pieces which it is more or less difficult to break down and tend to "spot" the mayonnaise or salad dressing. As a result, rapid emulsification is not securable, nor is a smooth, homogeneous product obtained. And when water is added to this product, either as such or in the form of the vinegar or similar acid solutions, or wines or other aqueous material, there is a tendency for lumping due to the fact primarily that the emulsifier is not sufficiently dispersed throughout the media present.

However, by dispersing the spices, emulsifying agent, and similar materials in the salad oil component, the tendency toward caking or packing is retarded quite substantially, because the oil separates the particles of the dry material, such as spices and emulsifier, etc., and protects against moisture in the air and avoids any caking on standing, with the result that the product can be rapidly and easily dispersed in the subsequently added components, by the consumer, to produce a smooth, homogeneous material.

While any oil or fat can be employed for incorporation with the dry materials in order to reduce the caking or packing development, it has been found even more advantageous to incorporate these dry materials, like the mixture of spices and emulsifying agent, etc., into a quantity of hydrogenated or hardened to semi-hardened oil or fat, or a mixture of a hardened and a liquid oil or fat, depending upon the consistency desired. In this way the spices, emulsifying agent, etc. appear to have each of their particles surrounded by the hardened oil or fat, thus maintaining the particles in a condition in which there is no tendency to produce caking. In such procedure where the hardened oil or fat is employed, the spices, emulsifying agent, etc. can either be mixed into the hardened oil and the liquid oil of the mix poured on the mixture of spices, etc. with hardened oil, or the liquid oil can be intermixed throughout the mass of hardened oil carrying the spices emulsifier, etc.

As exemplary of a particular combination of ingredients that may be employed, the following is given:

| | | |
|---|---|---|
| Mustard | grams | 5 |
| Salt | do | 15 |
| Citric acid | do | 3 |
| Gum karaya | do | 18 |
| Sugar | do | 22 |
| Oil | fluid ozs | 10½ |
| Shortening | grams | 25 |

Desirably, as indicated above, the dry materials are mixed and incorporated into the shortening, and the oil is then added, and the products thoroughly mixed together. The shortening may for example be a hydrogenated oil.

The components and proportions thereof, as given in this example, are not limiting, but may be varied within substantial limits, depending on the characteristics of the salad dressing ultimately to be produced therefrom. Variations in both the specific materials or specific quantities may, therefore, be made. The amount or type of colloid or emulsifying agent, or combination employed, may be varied to suit the desired purpose, and various types of acid-containing materials or spices or amounts of spices, variation in the amount and character of oil, etc., may all be utilized, depending on the consistency and flavor characteristics desired in the product.

Such a dressing base thus produced may be utilized in a variety of ways to produce any desired type of dressing.

Thus, an exemplary procedure is to place the dressing base into a bowl, add one or more whole eggs or egg yolks as required, and an amount of water, depending upon the consistency sought in the finished mayonnaise or salad dressing. These materials may be readily mixed together until thickening takes place, whereupon the mayonnaise or salad dressing is completed. For flavor, vinegar, lemon juice, additional salt, mustard or other spices or flavoring material may also be added. If it is desired to thin the product, any aqueous material, such as water, vinegar, etc., may be added. A specific manner of producing a mayonnaise type salad dressing may be as follows:

The mix as purchased is stirred, and an equal quantity of water added. Add one whole egg, and mix all of the components together until the dressing thickens.

The base material as purchased and referred to above, may be utilized for the production of any types of dressings desired, and thus is utilizable as a base material for the production of various dressings, including mayonnaise, salad dressing, French dressing, Thousand Island dressing, tartar sauce, hollandaise, etc., the base lending itself to the ready production of any type of salad dressing, without danger of deterioration or failure in the production of such materials. Thus as exemplary in making a hollandaise dressing, the following is given:

To 4 heaping tablespoons of the dressing produced under the specific example last given above, add 12 tablespoons of melted butter, desirably adding the butter in limited proportions from time to time, while mixing thoroughly. Finally add ⅛ of a teaspoon of salt and 1 teaspoon of lemon juice, and mix the entire product together.

Because of the variation possible in the character of ingredients and proportions, it is important to note that the dressing base can be made in any number of ways to give any mild or strong spice flavor, to obtain a heavier or thinner consistency with any desired amount of oil or water, etc., to provide for more or less water to be used by the consumer, to provide for more or less stirring or mixing and to enable various methods of mixing or preparation to be used by the consumer. These variations become possible through changes in quantity or type of spices, flavoring materials, emulsifying agents, etc.

While, as pointed out above, it is preferable to produce the mix with no water or aqueous materials employed, and to keep as much moisture as possible out of the mix in order to minimize any possible rancidity in the oil by deterioration on standing, the product can be made with vinegar added thereto, or other aqueous materials are mixed with the base, which to that extent eliminates the necessity for the user of the dressing base, such as a housewife, adding vinegar when she makes the mayonnaise or salad dressing. However, the presence of moisture is desirably avoided for the most stable products and in no event should be present in an amount sufficient to cause rapid deterioration.

Accordingly a dressing base is produced in accordance with the present invention which is free from deterioration or decomposition, or change in flavor due to storage. The elimination of the eggs, and the production of a dressing base that can be readily emulsified into the desired added components by the user, is of fundamental importance.

As illustrating the advantages and novel results secured by means of the present invention, the following may be noted. Variation in the amount of water or aqueous materials that are added to the base in the production of the final salad dressing or mayonnaise enables the consistency to be controlled by the user. Since the dressing base can be made with any degree of mildness of flavor, additional salt, sugar, mustard or other condiments can be added to change the flavor to suit the requirements of any particular individual. There is thus a much greater elasticity in adjustment of flavor and consistency of products produced in accordance with the present invention as compared with factory-made mayonnaise. The importance of this feature is further emphasized by the fact that different types of dressings are required for use with various foods, as, for example, fruit salad, chicken salad, etc. The finished mayonnaise made with the base of the present invention can be mixed with whipped cream for fruit salads, or with the addition of butter and lemon juice can be made into a hollandaise dressing, or with vinegar, salt, paprika, etc., can be made into a French dressing. The ease with which the base is incorporated into the added components by the user eliminates any necessity for strenuous whipping or beating, and reduces very materially the time required in the production of the mayonnaise or similar final salad dressing, and also eliminates possibility of spoilage through separation or breaking of the emulsion. Since a dressing base is produced under the present invention, it can be more cheaply made, due to the use of a smaller container, lower freight costs, and the product is economical, since a small quantity of the dressing base will make a larger amount of mayonnaise or other salad dressing. In this connection, it is important also to note that the elimination of water and eggs reduces the size of the product, and the freight on such components.

Since the mayonnaise or salad dressing can be readily made at home by the consumer with fresh eggs and good oil to provide the final mayonnaise or salad dressing desired in its freshest condition, all the flavor and health value of the fresh mayonnaise is produced as compared with commercial or factory-made mayonnaise, which deteriorates between the time of manufacture and actual consumption. The dressing base of the present invention is not perishable, and avoids the necessity for rapid distribution systems, or refrigeration required for mayonnaise and salad dressings of the commercial type. The products of the present invention can, therefore, be handled by grocery jobbers in identically the same way as other non-perishable items at lower costs.

Salad dressings should be looked upon from the standpoint of their flavor, appetite appeal and freshness, which should be the major emphasis in such cases. And maximum quality in any of these and other features is possible with the present invention as compared with factory-made mayonnaise. Further in factory-made mayonnaise, during the winter it is necessary to use corn oil instead of cotton seed oil in order to avoid freezing and segregation of components. And again, in connection with factory-made mayonnaise, to preserve the perishable materials, it is necessary to use higher percentages of salt and vinegar, which act more or less as natural preservatives, but which give a higher seasoning than is desirable. Under the present invention, it is possible to minimize the quantity of salt or vinegar, or other flavoring ingredient, without loss of desirable properties in the material, while producing a product of enhanced flavor and freshness. The fact that olive oil or any other desired salad oil can be employed makes for a more wholesome product.

From the manufacturer's standpoint in commercial mayonnaise, there is considerable loss due to the perishable character of the product. Such undesirable features are eliminated in the present invention, and extensive distribution systems are not required, as pointed out, due to the stable character of the present products. Mayonnaise or salad dressing produced with the base of the present invention will "stand up" longer than mayonnaise made in the usual way at home. Not only is the mayonnaise more readily produced at home, therefore, by utilizing the base of the present invention, but it is produced with a minimum of stirring or beating operation, while always insuring a successful end product.

The nature of mayonnaise itself has led to the difficulties of producing a satisfactory product at home; since it is an emulsion which comprises approximately 15% moisture and 80% of oil, the proper emulsification of the ingredients requires careful and almost scientific care. This cannot readily be done at home, but with the present invention, the housewife is enabled to be assured of producing a mayonnaise in which the ingredients are homogeneously blended and retain themselves in that condition without any unusual attention or care on the part of the maker of the final salad dressing. The readability with which mayonnaise or salad dressings are produced utilizing the base of the present invention, enables mayonnaise to be made more readily at home, and permits the preparation of fresh mayonnaise and salad dressing with a minimum of effort, thereby increasing the production of mayonnaise and other salad dressings in the home, with very material benefits in view of the more wholesome character of the products and the freshness of the ingredients involved. These features are desirable not alone from the standpoint of home consumption, but also in the ready production of such mayonnaise and salad dressings for lunch counters, luncheonettes, restaurants, sandwich makers, hotels, etc. Furthermore, the base lends itself, as pointed out to the preparation of different forms of dressings, such as mayonnaise, French dressing, hollandaise, Thousand Island dressing, etc. All of these features are readily carried out by the utilization of the present invention, but factory-made mayonnaise or similar products do not lend themselves as readily or as fully to modification of flavor and consistency to the desires of the consumer.

The avoidance of eggs as set forth above is primarily from the standpoint of avoiding any substantial introduction of moisture into the base material. That egg contains a substantial amount of water is evidenced by the fact that the base can be emulsified with eggs alone if sufficient of the latter are used. If dried egg is employed it may be utilized in the base, but even dried egg is best omitted from the base to avoid its pro-oxygenic effects.

Having thus set forth my invention, I claim:

1. A salad dressing base readily emulsifiable with egg in the presence of aqueous material to produce a smooth homogeneous product, said base being substantially non-aqueous and non-emulsion-like and consisting of the spices normally used in the production of salad dressings and emulsifying agent, in combination with a salad oil.

2. A salad dressing base readily emulsifiable with egg in the presence of aqueous material to produce a smooth homogeneous product, said base being substantially non-aqueous and non-emulsion-like and consisting of the spices normally used in the production of salad dressings and emulsifying agent, carried intimately distributed throughout a hardened salad oil or fat, in combination with a salad oil the amount of oil being sufficient to give a substantially fluid product.

3. The method of producing a salad dressing base readily emulsifiable with egg in the presence of aqueous material to produce a smooth homogeneous product, which consists in combining the spices and emulsifying agent, incorporating said dry components into a hardened salad oil or fat to intimately distribute them therein, and combining said resultant product with a salad oil.

4. A french dressing base readily emulsifiable with egg in the presence of aqueous material to produce a smooth homogeneous product, said base being substantially non-aqueous and non-emulsion-like and consisting of the spices normally used in the production of french dressings and emulsifying agent, in combination with a salad oil.

5. A hollandaise dressing base readily emulsifiable with egg in the presence of aqueous material to produce a smooth homogeneous product, said base being substantially non-aqueous and non-emulsion-like and consisting of the spices normaly used in the production of hollandaise dressings and emulsifying agent, in combination with a salad oil.

6. A salad dressing base readily emulsifiable with egg in the presence of aqueous material to produce a smooth homogeneous product, said base being substantially non-aqueous and non-emulsion-like and consisting of the spices normally used in the production of salad dressings and a gum emulsifying agent, in combination with a salad oil.

ALBERT MUSHER.